Jan. 20, 1953     R. B. PRESSLER     2,625,914

METER FOR INDUSTRIAL LIQUIDS

Filed March 5, 1945     2 SHEETS—SHEET 1

RALPH B. PRESSLER
INVENTOR.

BY Edmund W. E. Kamm
ATTORNEY

Patented Jan. 20, 1953

2,625,914

UNITED STATES PATENT OFFICE 2,625,914

METER FOR INDUSTRIAL LIQUIDS

Ralph B. Pressler, Fort Wayne, Ind., assignor to Bowser, Inc., Fort Wayne, Ind., a corporation of Indiana Application March 5, 1945, Serial No. 580,985

5 Claims. (Cl. 121—119)

This invention relates to a fluid meter of the positive displacement type which is adapted to meter a wide variety of liquids and which is simple and rugged in construction.

Heretofore some positive displacement meters have been built which were intended to meter alkaline, acidic or other corrosive liquids. Such meters were usually of all metal construction because of the corrosive action of the liquid but were not highly successful because many such liquids are "dry," that is, they are poor lubricants and the metal to metal contact between the unlubricated movable and stationary parts, usually of stainless steels or bronzes, produced wear which eventually produced inaccuracy and/or inoperativeness due to seizing of the parts.

Similarly, attempts have been made to apply meters for metering liquids containing abrasive materials, such as, for instance, crude oils which contain sand and other grit, and numerous attempts have been made to design meters for this service. Nevertheless, usually the life of a positive displacement meter, or any other meter for that matter, has been measured in hours in such service. Consequently, wells "making" even moderate to small amounts of sand have heretofore been considered to be unmeterable and resort has been had to large and expensive gauge tanks with their attending problems.

Applicant's structure as disclosed in this specification is capable of and has, in actual test, proven itself capable of overcoming the difficulties recited above in both the corrosive and the abrasive liquid fields.

It is therefore an object of the invention to produce a meter which will withstand the action of dry corrosive liquids.

Yet another object of the invention is to produce a meter which will withstand abrasion by liquids which contain abrasive materials.

Another object of this invention is to produce a meter of great accuracy of measurement with a low differential of inlet and outlet of pressures.

Yet another object of this invention to to produce a meter which will operate smoothly throughout its capacity and pressure range.

Still another object of this invention is to produce a meter of the control plate and track type which eliminates slippage of the control plate on the track, thereby reducing friction and wear on these two members.

A further object of this invention is to produce a meter which will satisfactorily measure many liquids heretofore considered difficult or impossible to meter.

Another object of this invention is to provide a meter which is not dependent upon the metered liquid for its lubrication.

Another object of this invention is to provide a meter which can be easily assembled and disassembled.

Another object of the invention is to provide a piston meter, in which the valve timing is not affected by wear of the parts.

Yet another object of the invention is to provide a meter in which the bearings are sealed against the entrance of the liquid being measured.

Still another object of the invention is to provide a meter having carbon bearings throughout.

It is another object of the invention to provide a control plate and a track therefor, together with mating gears for preventing any substantial relative sliding movement between the plate and the track.

Yet another object of the invention is to provide all the ball journals with carbon bearings.

Still another object of the invention is to dispose all such bearings in shielding relation over the ball journals to prevent the entrance of abrasive materials.

Another object of the invention is to provide circumferentially grooved pistons which continually scrape the cylinder walls.

Yet another object of the invention is to provide an eccentric valve driving mechanism.

Still another object of the invention is to provide a carbon valve which is axially expandable.

It is still another object of the invention to make all parts which have surfaces which slide on the other of metal and carbon respectively wherever possible.

These and other objects will be apparent from a study of the specification and accompanying drawings of which:

Figure 1:
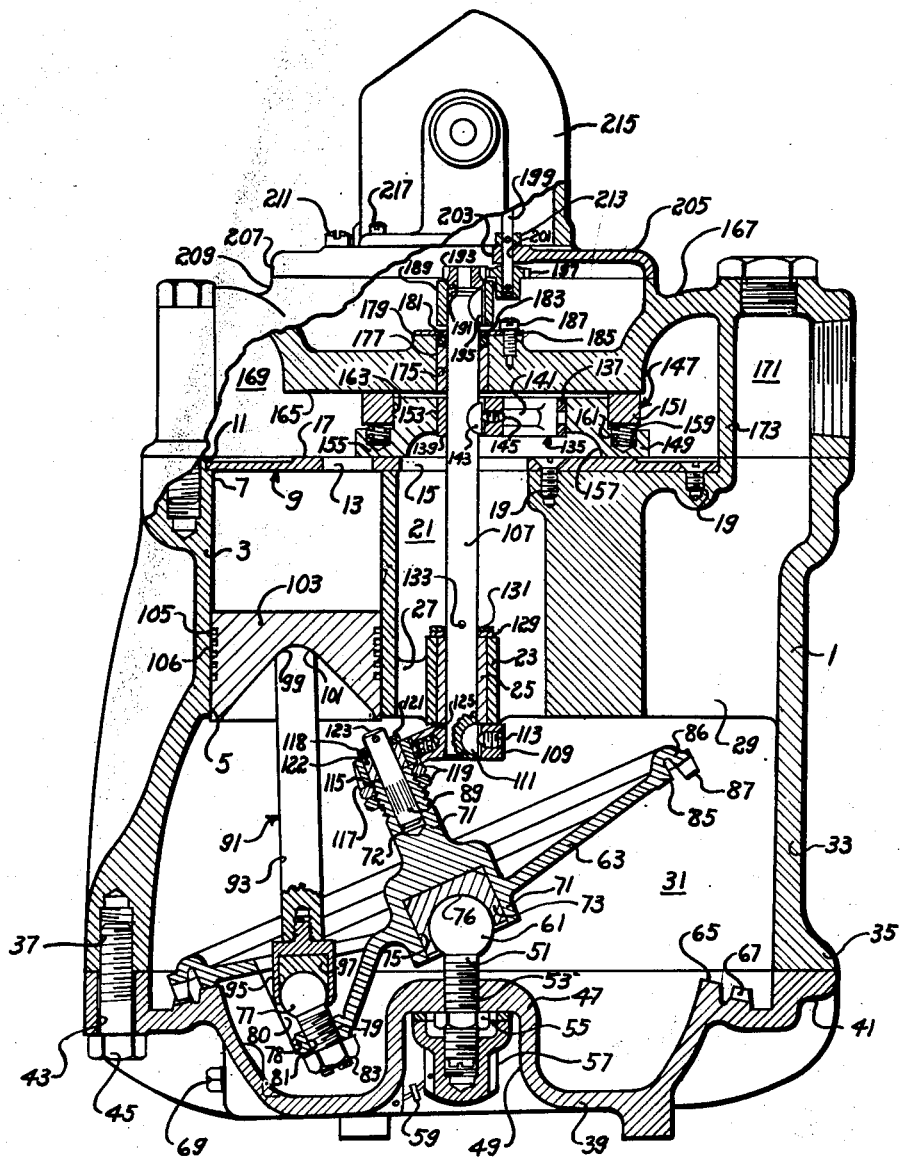
Figure 1 is a vertical sectional view of the meter, taken substantially on the center line, showing the various parts in assembled position.
Figure 2:
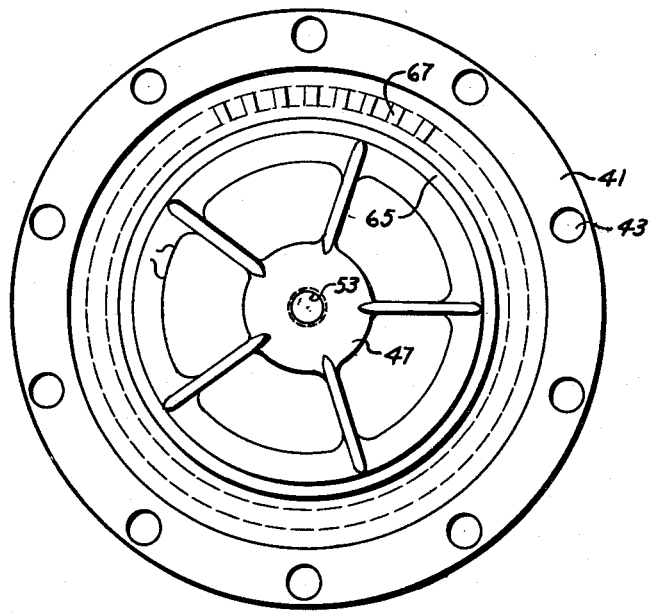
Figure 2 is a plan view of the meter bowl showing the gear teeth and track.
Figure 3:
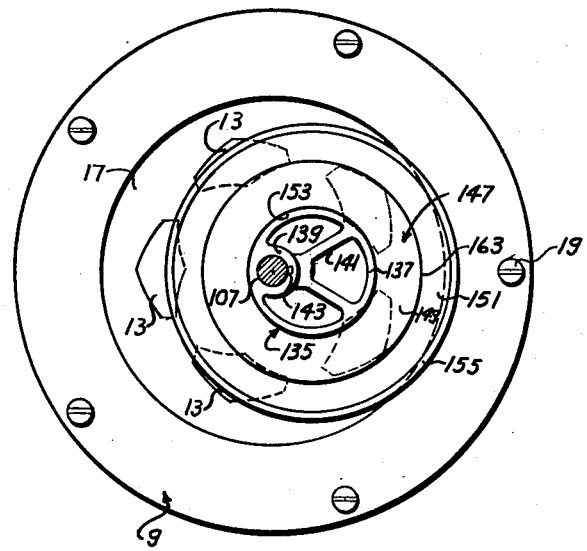
Figure 3 is a plan view of the valve and port plate arrangement.

Referring to Figure 1 of the drawings, the numeral 1 designates the cylinder block in which preferably five cylinders 3 are formed which are spaced radially about the vertical center line of the block. The lower ends 5 of the cylinders are completely open while the upper ends 7 are closed by a circular port plate 9 which is set in a recess 11 of the block. Ports 13 equal in number to and opening into the cylinders and a centrally located circular hole 15, are formed in the port plate. A circular raised surface 17 on the top of the plate extends from the central hole out beyond the ports. This surface is highly finished and forms a valve seat. Flat headed screws 19 are countersunk into the port plate and fasten the port plate to the cylinder block.

A cored cylindrically shaped passage 21 coincides with the central hole 15 of the port plate and extends through the block between the cylinders. A boss 23, which is concentric with the axis of the meter and which is provided with an insert bearing 25, preferably made of graphite carbon, is supported adjacent the bottom of the passage by means of webs or spokes 27.

A discharge passage 29 is cored into the cylinder block and extends from the top of the block to a chamber 31 which is formed by a substantially circular and flared wall 33 terminating in the flange 35, at the bottom of the cylinder block. Tapped holes 37 are equally spaced about the flange.

The bowl 39 has a flange 41 mating with the block flange 35. Clearance holes 43 are aligned with the tapped holes 37 in the block and screws 45 are utilized for fastening the bowl to the block, thereby forming a liquid tight metal to metal joint.

Concentric with the central axis of the bowl is an interior boss 47 which is provided with an exterior circular recess 49. The adjusting screw 51, lock nut 55, seal cap 57, and seal wire and lead 59 nest in the recess above the bottom surface of the bowl. Tapped hole 53 receives the adjusting screw.

The upper part of the adjusting screw is formed with a spherical journal 61 which supports the control plate 63. A raised frusto-conical track 65, and a fixed gear 67, both annular in shape, are cast into the bowl. The pipe plug 69 closes a drain hole located at the lowest point of the meter.

The circular shaped control plate has an axially directed boss 71 which is recessed at 75 to receive a bearing 73. The bearing is preferably made of graphitic carbon and is provided with a hemispherical cavity 76 which is adapted to receive the journal 61.

Five spherical journals or balls 77 are attached to the lower walls 78 of pockets 80 formed in the control plate and are positioned radially about and preferably in, the same plane. The balls 77 have threaded stud portions 79 extending downwardly through tapped holes 81 and are locked in position by jam nuts 83.

An inverted frusto-conical track 85 is formed on the under side of the control plate and a portion of this track is continuously in contact with the bowl track 65. The apices of the cones coincide with the center of the spherical journal 61. A bevel gear 86, which is integral with the control plate and of larger diameter than track 85, is provided with teeth 87 which extend downwardly and, upon rotary motion of the control plate, mesh successively with gear teeth 67 of a fixed bevel gear.

The apices of the pitch cones of the bevel gears are coincident with the center of journal 61.

The piston rods 91 comprise a shaft 93, a hollow cylindrical socket 95, which receives a bearing 97 having a hemispherical cavity and which is preferably made of graphitic carbon. The socket extends beyond the bearing and is swedged over ball 77 so as to form a ball and socket joint. The upper end of the piston rod has a convex spherical radius 99 which seats in a concave spherical seat 101 of the piston 103, the latter being also preferably made of graphitic carbon. A series of circumferential sharp edged grooves 105 are formed in the piston to provide a liquid seal between the piston and the cylinder wall. These grooves also will receive foreign particles which are scraped from the cylinder wall by the edges of the lands 106 between the grooves, and this reduces wear on the walls.

Figure 4:
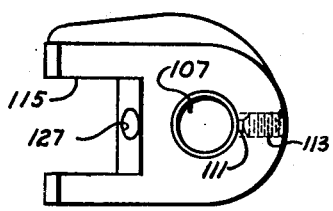
Figure 4 is a bottom view of the drive arm.

The drive shaft 107 is journaled near its lower end in the bearing 25. The portion of the shaft projecting below the bearing carries the drive arm 109, the latter being secured to the shaft by key 111 and set screw 113. The drive arm has a forked portion 115 (Figure 4) offset at an obtuse angle to the axis of drive shaft 107 so as to be at substantially right angles to the shaft 89 which has one end knurled and pressed into an opening 72 which is coaxial with the boss 71 on the control plate. The fork receives the anti-friction roller 117 having an insert bearing 118 preferably made of graphitic carbon and held in position on the shaft 89 by lock nuts 119, washer 121, and a pin 123. A washer 122 of felt, synthetic rubber or other material is provided to keep grit out of bearing 118. A spring 125 is seated in hole 127 of the drive arm and exerts a force on the roller 117 in a direction away from shaft 107 to maintain gear teeth 67 and 87 and the tracks 65 and 85 in engagement.

Washers 129 of felt or synthetic rubber and 131, of metal, along with pin 133, cooperate to keep the drive shaft 107 from dropping down and also prevent grit from entering the bearing 25.

The relationship of the track control plate, spherical journals, shaft 89 and associated parts when viewed in a radial plane which includes the shaft 89, the center of journal 61, the center of a journal 77 and the point of contact of track 65 with track 85, is as described below.

The axis of shaft 89 forms an angle of less than 90 degrees (preferably 78°) with the line joining the point of contact of the tracks and the center of journal 61.

The line joining point of contact between the tracks with the center of journal 61 is disposed preferably at an angle of 12° below the horizontal through the journal 61. This construction causes the axis of shaft 89 to be displaced from the vertical by an angle of 24° so that the radius of the drive arm is relatively long. This reduces bearing pressures on arm 109 and provides for more effective transmission of torque to shaft 107.

In nutating the control plate a half revolution, the lines joining the former points of contact between the tracks with the center of the journal 61 will form an angle of 48 degrees. The line joining the point of contact on the control plate track with the center of journal 61 will move from a position 12° below the horizontal through said journal to a position 36° above it. Thus, if the journals 77 were disposed with their centers on this line there would be considerable horizontal displacement to produce excessive angularity of the piston rods 91. To reduce such angularity to a minimum the centers of the journals 77 are disposed on a line which runs through the center of 61 at an angle 24° below the horizontal, when the two tracks are in contact, so that the movement of the control plate track to its 48 degree position will move the journal 77 to a position 24 degrees above the horizontal. The horizontal displacement of the ball is thus reduced to the minimum and the displacement is equal in all corresponding positions above and below the horizontal.

Obviously, the selection of an angle of 12 degrees throughout in describing the preferred form is one of convenience, and any other suitable angle may be used in designing a meter of this type.

The relation between the center of the journal 61 and the apex angles of the fixed track cone and fixed gear cone is disturbed somewhat by adjustment of the journal 61 up and down. However, wide adjustment of the journal is seldom required, and, even if it is required, the functions of the mechanism are not disturbed and the advantages of the structure are not lost.

An eccentric 135, comprised of an annular ring 137 and an off center hub 139, joined by spokes 141, is secured to the drive shaft 107 by key 143 and set screw 145.

The valve 147 is comprised of a lower ring 149 and an upper ring 151, both annularly shaped and preferably made of graphitic carbon. The lower ring has a concentric hole 153 providing a slip fit over the ring 137 of the eccentric, a radially directed flange 155, a cavity or counterbore 157 formed in the lower side to reduce friction, and to permit passage of liquid from ports 13 to the passage 21, and holes 159 disposed parallel to the axis of the ring. The upper valve ring 151 slips down over the lower ring and rests on springs 161 and forms a liquid tight joint at 163 with the lower ring.

The upper valve ring seats against the valve plate 165 machined in the meter head 167. The springs 161 maintain the lower and upper valve rings in a sealing relation to their seats 17 and 165 respectively.

The head has an inlet chamber 169 which receives liquid from a tapped inlet (not shown) and an outlet chamber 171 with wall 173 separating the two chambers. The inlet chamber distributes the incoming liquid to each of the ports 13 while chamber 171 communicates with the passages 21 and 29 of the cylinder block and with the cavity in the lower valve ring.

A hole 175 in the head and boss 179 is concentric with shaft 107 and has a bushing 177 preferably made of graphitic carbon pressed in flush with the valve plate 165. The bushing is shorter than hole 175 and its upper end is disposed below the surface of the circular boss 179 thus forming a recess 181 for the reception of a toroid seal 183, which when compressed by the side walls of the hole 175, retainer plate 185, and shaft 107 as the latter is passed through the bushing and toroid, provides a liquid seal between the meter head and the drive shaft. The toroid retainer plate 185 is fastened to the boss 179 by screws 187.

A collar 189 is fastened to the top end of shaft 107 by key 195 and revolves with the shaft; and into the upper end of this collar is pressed the hub 191 of spur pinion 193. Where space permits, the collar and gear are replaced by a gear with a suitable hub keyed to the shaft.

Gear 193 meshes with gear 197, the latter being pinned to shaft 199 which is supported by the bearing 201 machined in boss 203 of an adapter member 205.

A collar 213 is pinned in position on the shaft 199 to prevent the shaft dropping down. The shaft 199 couples to the drive shaft (not shown) of the register 215. Screws 217 fasten the register to the adapter.

The adapter has a circular base 207 mating with an annular upwardly extending projection 209 which is formed as a part of the meter head.

*Operation*

In operation liquid enters chamber 169 and passes through such of the ports 13 as are uncovered by the valve into the corresponding cylinders, exerting a downward thrust upon the pistons 103. This thrust is transmitted to the control plate 63 through the piston rod 91 thereby causing the control plate to nutate. The control plate track 85 rides upon track 65 of the bowl with teeth 87 and 67 of the control plate and bowl respectively in engagement.

The nutatory motion of the control plate is converted into a rotary motion of boss 71 which is transmitted to the driving arm 109, shaft 107 and eccentric 139. The shaft 107 being mounted in two widely spaced bearings, is rigidly and accurately supported. This promotes long life of the bearings. The rotation of the eccentric imparts rotary motion to the valve 147, which is timed to successively close each port 13 to the inlet chamber 169 as a particular cylinder is filled and will shortly thereafter open the port to the discharge chamber 171 by way of valve cavity 157, hole 15, passage 21, chamber 31 and discharge passage 29. The valve (Figure 1) is rotated out of its true relation with respect to the control plate to enable the valve details to be more effectively shown.

The cycle of the valve and an individual cylinder is as follows: port 13 closed and piston 103 at top of stroke; port open to inlet and piston descending as cylinder fills; measured quantity in cylinder, port closed and piston at bottom of stroke; port opens to discharge and pistons rise forcing measured liquid from the cylinder to the discharge.

The differential between the inlet and discharge pressures is always applied to some of the pistons, and this supplies the power to operate the meter.

The rotary motion of shaft 107 is transmitted to the eccentric and thereby to the valve which sweeps the port plate 9 and the surface 165, and to the register 215 by means of gears 193 and 197 to indicate the quantity of liquid metered.

A variation of the piston stroke, resulting in a change in the volumetric displacement of each cylinder is obtained by adjusting ball 61. Lowering the ball reduces the effective stroke of each piston and results in a reduction of the quantity of liquid delivered per revolution of the meter. Raising the ball increases the piston stroke and increases the quantity delivered per revolution of the meter.

The gear teeth 87 and 67 of the control plate and bowl respectively cooperate to prevent any substantial slippage of the control plate relative to the track, practically eliminates wear on the control plate and the bowl, and also produces a quiet and smooth running meter.

It has been customary in this type of meter to use the liquid being metered as a lubricant for the bearings, but this has limited the usage of this type of meter to liquids which were free from abrasives and which were lubricants. By the use of graphitic carbon in the bearings 25, 73, 97, 118 and 177, pistons 103, and valve 147, the meter requires no lubricants and the field of application of this type meter has been materially broadened. Further, by shielding the ball journals, sealing the cylindrical bearings against the entry of liquid being metered, and by providing grooves in the pistons, the metering of abrasive liquids is made possible.

Applicant prefers to use a graphitic carbon known to the trade as "Graphitar, Grade No. 2," manufactured by the U. S. Graphite Company. It is a composition of carbon and graphite which is not impregnated with lubricant and which is readily machinable.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a fluid meter comprising a case having a fluid inlet, an outlet, and displacement means comprising a plurality of cylinders, each having a port, pistons mounted for movement in said cylinders, valve means for said ports for controlling the flow of fluid to and from said cylinders and means connecting said valve means to be driven by said pistons, the improvement wherein said connecting means comprises a control plate having a peripheral gear and an annular track, a corresponding gear and track in said case, said tracks cooperating to support said plates and limit the degree of engagement of the gear and said gears cooperating to prevent rotation of said plate relative to said pistons.

2. In a fluid meter comprising a case having displacement means comprising a plurality of cylinders, pistons in said cylinders, and a control plate, a valve, a central spherical journal upon which said control plate nutates, means mounting said journal for adjustment along its vertical axis to vary the displacement, the improvement which comprises an inverted frusto-conical track formed on the control plate having its apex coincident with the center of said journal, a frusto-conical track fixed in said case and having its apex coincident with the vertical axis of said journal, a shaft on said control plate coaxial with the axis of the control plate frustum, means driven by said shaft for actuating the valve, the apex angles of said frustums being equal, a gear on said control plate parallel with said track and a gear on the case adapted to mesh with said first-named gear.

3. In a fluid meter comprising a case having displacement means comprising a plurality of cylinders, pistons in said cylinders, piston rods and a control plate, a valve, a central spherical journal upon which said control plate nutates, means for adjusting the journal along its vertical axis to vary the displacement, the improvement which comprises an inverted frusto-conical track formed on the control plate having its apex coincident with the center of said journal, a frusto-conical track fixed in said case and having its apex substantially coincident with the center of said journal, a shaft on said control plate coaxial with the axis of the control plate frustum, means driven by said shaft for actuating the valve, the apex angles of said frustums being equal, said piston rods connecting said pistons with spherical journals on said control plate, the centers of said rod journals being disposed at such a distance below the level of the track on the control plate that a horizontal plane through the central journal will bisect the path of travel of the centers of the rod journals, a gear on the control plate parallel with said track thereon and a gear on the case parallel with the track on the case, said gears being constructed and arranged to mesh progressively as said control plate nutates.

4. In a fluid meter, a mechanism comprising a control plate and a case, a central spherical journal in said case upon which said control plate nutates, an inverted frusto-conical track formed on the control plate having its apex coincident with the center of said journal, a frusto-conical track fixed in said case and having its apex substantially coincident with the center of said journal, the apex angles of said frustums being equal, a gear on said control plate parallel with said track and a gear on the case adapted to mesh with said first named gear.

5. In a fluid meter, a mechanism comprising a control plate, a central spherical journal upon which said control plate nutates, means for adjusting said journal along its vertical axis to vary the displacement, an inverted frusto-conical track formed on the control plate having its apex coincident with the center of said journal, a frusto-conical track fixed in said case and having its apex substantially coincident with the center of said journal, the apex angles of said frustums being equal, piston rods mounted in spherical journals on said control plate, the centers of said rod journals being disposed on the control plate at such a distance below the level of the control plate track that a horizontal plane through the central journal will bisect the path of travel of the centers of the rod journals, a gear on the control plate parallel with said track thereon and a gear on the case parallel with the track on the case, said gears being constructed and arranged to mesh progressively as said control plate nutates.

RALPH B. PRESSLER.

REFERENCES CITED

The following references are of record in the file of this patent:

UNITED STATES PATENTS

| Number | Name | Date |
|---|---|---|
| 165,139 | West | June 29, 1875 |
| 182,471 | Pocock | Sept. 19, 1876 |
| 459,328 | Dutton | Sept. 8, 1891 |
| 535,641 | Thomson | Mar. 12, 1895 |
| 575,991 | Schonheyder | Jan. 26, 1897 |
| 693,032 | Kent | Feb. 11, 1902 |
| 1,192,189 | Hanks | July 25, 1916 |
| 1,255,973 | Almen | Feb. 12, 1918 |
| 1,582,076 | Page | Apr. 27, 1926 |
| 1,649,235 | Jones | Nov. 15, 1927 |
| 1,799,875 | Thompson | Apr. 7, 1931 |
| 1,889,190 | Brandl et al. | Nov. 29, 1932 |
| 1,966,619 | Fick | July 17, 1934 |
| 1,999,362 | Jauch et al. | Apr. 30, 1935 |
| 2,076,363 | Brunner | Apr. 6, 1937 |
| 2,087,567 | Blum | July 20, 1937 |
| 2,133,270 | Blum | Oct. 18, 1938 |
| 2,198,623 | Kastler | Apr. 30, 1940 |
| 2,233,246 | De Lancey | Feb. 25, 1941 |
| 2,237,518 | Blum | Apr. 8, 1941 |
| 2,291,243 | Levy | July 28, 1942 |
| 2,337,310 | Chrisman et al. | Dec. 21, 1943 |
| 2,396,410 | Blum | Mar. 12, 1946 |

FOREIGN PATENTS

| Number | Country | Date |
|---|---|---|
| 145,694 | Great Britain | June 30, 1920 |
| 294,653 | Great Britain | June 6, 1929 |